S. DRAKE.
PARACHUTE ATTACHMENT FOR AEROPLANES.
APPLICATION FILED JUNE 21, 1912.
1,051,709.
Patented Jan. 28, 1913.
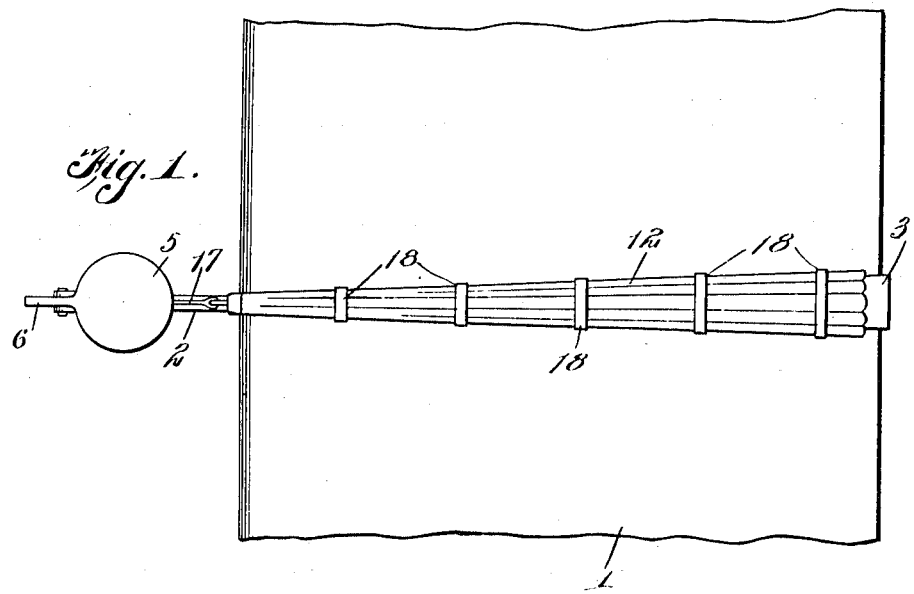
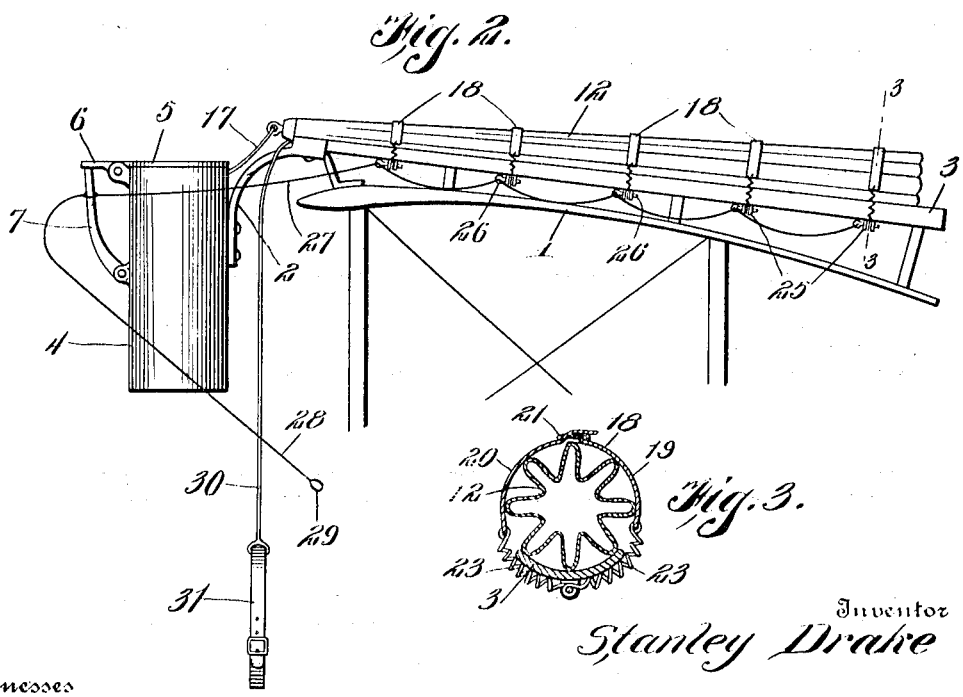

S. DRAKE.
PARACHUTE ATTACHMENT FOR AEROPLANES.
APPLICATION FILED JUNE 21, 1912.
1,051,709.
Patented Jan. 28, 1913.
2 SHEETS—SHEET 2.
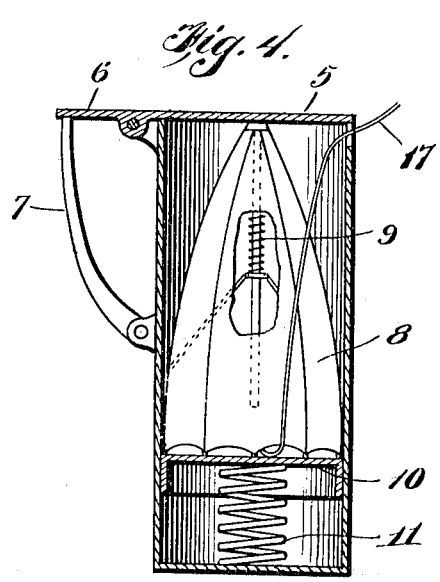
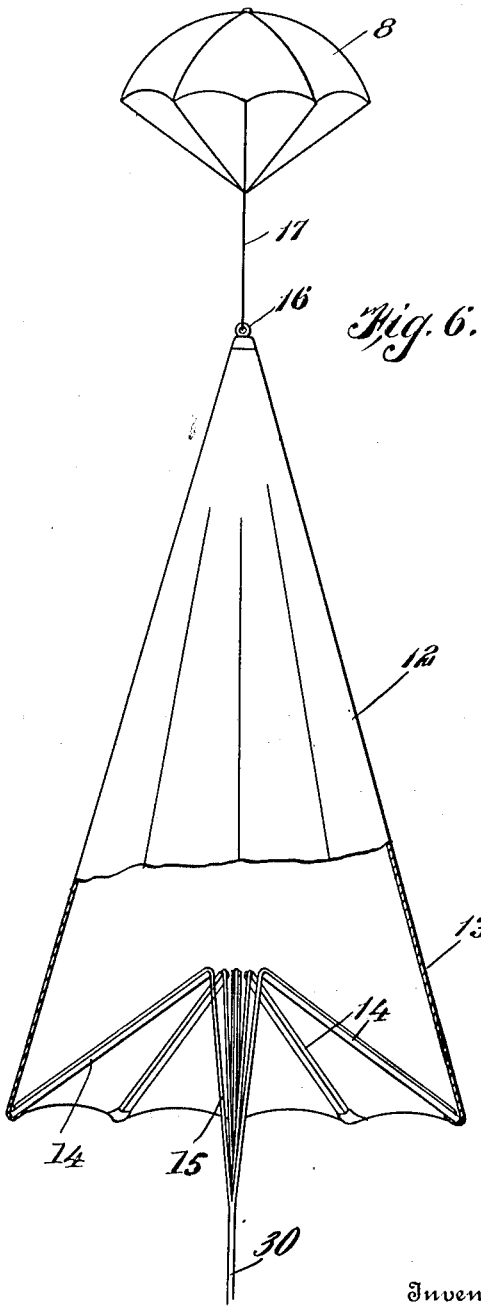
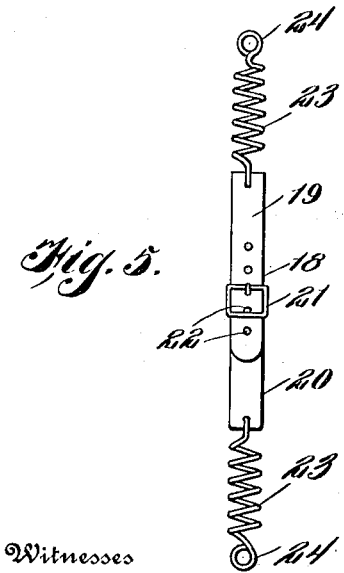
Witnesses
Louis S. Heinrichs
C. C. Hines
Inventor
Stanley Drake
By Victor J. Evans
Attorney

UNITED STATES PATENT OFFICE.

STANLEY DRAKE, OF DUNNVILLE, ONTARIO, CANADA.

PARACHUTE ATTACHMENT FOR AEROPLANES.

1,051,709.  Specification of Letters Patent.  Patented Jan. 28, 1913.

Application filed June 21, 1912. Serial No. 705,064.

*To all whom it may concern:*

Be it known that I, STANLEY DRAKE, a subject of the King of Great Britain, residing at Dunnville, in the Province of Ontario, Dominion of Canada, have invented new and useful Improvements in Parachute Attachments for Aeroplanes, of which the following is a specification.

This invention relates to safety attachments for aeroplanes or flying machines, contemplating the provision of a parachute normally arranged in collapsed condition and adapted to be released for action in the event of danger, for disconnection from the machine, said parachute being provided with means for supporting the aviator, whereby when a contingency arises, the aviator may jump from the machine and descend safely to the ground.

The object of the invention is to provide a parachute attachment of this kind which may be readily applied to any existing type of flying machine and easily and quickly released for action, and which at the same time is so constructed and arranged as to diminish the head resistance offered thereby to the flight of the machine.

A further object of the invention is to provide a parachute attachment including a main parachute adapted to carry the weight of the aviator, and a smaller parachute adapted when released to open quickly and automatically to release and carry the main parachute clear of the machine, together with simple and effective means whereby both parachutes may be simultaneously released from engagement with the machine for operation.

The invention consists of the features of construction, combination and arrangement of parts hereinafter fully described and claimed, reference being had to the accompanying drawings, in which:—

Figure 1 is a top plan view showing the application of the invention to the upper plane of a biplane flying machine. Fig. 2 is a vertical longitudinal section through the machine showing the device in position. Fig. 3 is a vertical transverse section on the line 3—3 of Fig. 2. Fig. 4 is a sectional view through the small parachute casing. Fig. 5 is a detail view of one of the confining straps for holding the larger or supporting parachute collapsed. Fig. 6 is a view showing the parachutes released and in operation.

Referring to the drawings, 1 designates the upper plane of the supporting surface of a flying machine of the character described, and 2 a bracket suitably attached thereto and including a rearwardly extending concavo-convex supporting arm 3, which may also be secured to the frame of the supporting plane in any suitable manner.

The bracket 2 carries at its forward end a casing 4 open at the top and adapted to be closed by a pivoted door or cover 5 having a latch arm 6 adapted to be engaged by a pivoted latch 7, whereby the cover may be held normally closed. The casing 4 is preferably arranged so as to depend below the lead edge of the upper plane, while the arm 3 extends between the lead and trail edges of the plane with all the parts of the parachute attachment disposed lengthwise in the line of flight, so as to diminish its head resistance to the progress of the machine.

Arranged within the casing 4 is a small parachute 8 provided with an opening spring 9, and which is normally stored in collapsed condition and rests upon a plunger 10, between which and the base of the casing is disposed an expansion spring 11. The pressure of this spring holds the parachute pressed against the lid or cover 5, which holds the parachute confined until the latch 7 is retracted, whereupon the parachute is projected by the spring 11 and cast into the air for operation. A larger or main parachute 12 is normally supported in collapsed condition, by and rests within the channel of the arm 3. This parachute includes an umbrella shape body 13 of fabric or other suitable material, the free edge of which is scalloped and provided with stiffening strips 14 of bamboo or other suitable material, whereby the free edge of the cover is normally and automatically slightly distended for the admission of air upon the release of said parachute so as to adapt it to rapidly open and fill. Secured to the cover and strips is a series of cords 15 which are converged and connected together at their free ends.

The upper end of the parachute 12 normally faces forwardly and is provided with an eye or loop 16 to which is attached a cord or leader 17 connected with the lower end of the staff of the small parachute 8, and said parachute 12 is normally held secured in collapsed condition upon the bracket arm 3 by a series of bands or straps 18, each preferably consisting of sections 19 and 20, one provided with a buckle 21 and the other with a series of openings 22 for adjustable engagement with the tongue of the buckle. To the free ends of the strap sections 19 and 20 are secured contractile springs 23 provided with terminal eyes 24. The straps encircle the parachute 12 and the eyes 24 of the springs thereof are brought into alinement and arranged between pairs of apertured keeper lugs 25 on the arm 3, and are held in position by sliding fastening pins 26. All of these pins 26 are connected with a releasing cord or wire 27, which is also attached to the latch 7, and thence depends in the form of an operating portion 28 having a hand loop 29 at its free end adapted to be grasped by the operator to pull upon said cord or wire, whereby the latch and fastening pins may be simultaneously retracted to free the two parachutes. To the connected ends of the cords 15 of the main parachute is connected one end of a rope or cord 30, the opposite end of which carries a belt 31 adapted to be secured about the waist of the aviator, as will be readily understood.

The parts of the parachute attachment normally occupy the collapsed and confined positions shown. When through any cause the airman looses control of the machine, or the machine begins to fall, the airman by pulling upon the cord 28 will release the two parachutes and may then jump from the machine. The small parachute 9 immediately upon being cast from the casing 4 opens and by its resistance to downward motion assumes a position above the main parachute 12, thus lifting the upper end of said main parachute with it and bringing said main parachute into operative position, free and clear of the machine. The parts will then assume the position shown in Fig. 6, from which it will be seen that the main parachute is brought to a perpendicular position by the small parachute, and that the belt or sling supporting the aviator hangs pendent from the staff of the main parachute. The small parachute, being opened instantly upon release, at once begins to fill and oppose a certain resistance to the fall, and after a certain interval the main parachute opens and fills, thus breaking the fall, whereby a gradual, easy and safe descent of the airman to the ground is insured. As soon as the pins 26 are released, it will, of course, be understood that the contraction of the springs 23 will free the bands 18.

It will be seen from the foregoing description that my invention provides a parachute attachment for flying machines which is adapted for application to any ordinary type of flying machine, and which, in the event of danger, enables the airman to cast himself loose from the machine, with a high degree of safety and certainty of a gradual and easy descent to the ground without injury. It will, of course, be understood that the releasing cord 28 may be attached to the aviator in such manner that if he should be thrown from the machine or incapacitated from any cause and falls from his seat or moves out of his accustomed position, the parachute will be released automatically, so as to carry the airman safely to the ground.

I claim:—

1. In a safety parachute attachment for aeroplanes, the combination of a support including a casing, a spring actuated impeller arranged within said casing, a door for closing the casing, a normally collapsed main parachute, a smaller parachute connected with the uper end of the main parachute and normally held collapsed within the casing, a sling connected with the main parachute, latch mechanism for holding the main parachute collapsed and the door of the casing closed, and means for releasing said latch mechanism.

2. In a safety parachute attachment for aeroplanes, the combination of a support including a casing, an impelling device within said casing, a door for closing said casing, a small parachute housed within the casing and adapted to be held from expulsion by the door, said parachute being provided with automatic opening means, a latch for holding the door closed, fastening devices for holding the main parachute collapsed, said fastening devices including fastening members, a connection between the small parachute and the upper end of the main parachute, a sling connected with the lower end of the main parachute, and means for simultaneously releasing the latch and fastening devices.

3. In a safety parachute attachment for flying machines, the combination of a support including a casing, an ejecting device within the casing, a quick opening small parachute disposed within said casing, a door for closing the casing and holding said parachute collapsed therein, a latch for holding said door closed, a main parachute, a cord connecting the small parachute with the upper end of the main parachute, a series of fastening bands for holding the main parachute collapsed, fastening members for holding the bands in confined position, a sling suspended from the lower end of the main parachute, and means for simultaneously releasing the latch and fastening devices.

4. In a safety parachute attachment for flying machines, a supporting bracket carrying a casing and an arm, a small parachute normally held collapsed within said casing and adapted to open immediately upon release, a door for closing said casing and holding said parachute confined, a latch for holding the door closed, means for projecting said parachute when the door is released, a normally collapsed main parachute supported by the arm, a connection between the smaller parachute and upper end of said main parachute, a series of fastening bands embracing the arm and main parachute, said bands being provided with releasing springs, fasteners for holding the bands in confining position, a sling connected with the main parachute, and means for simultaneously releasing the latch and fastening devices.

In testimony whereof I affix my signature in presence of two witnesses.

STANLEY DRAKE.

Witnesses:
J. C. PAYNE,
O. E. WILLSON.